Figure 1:
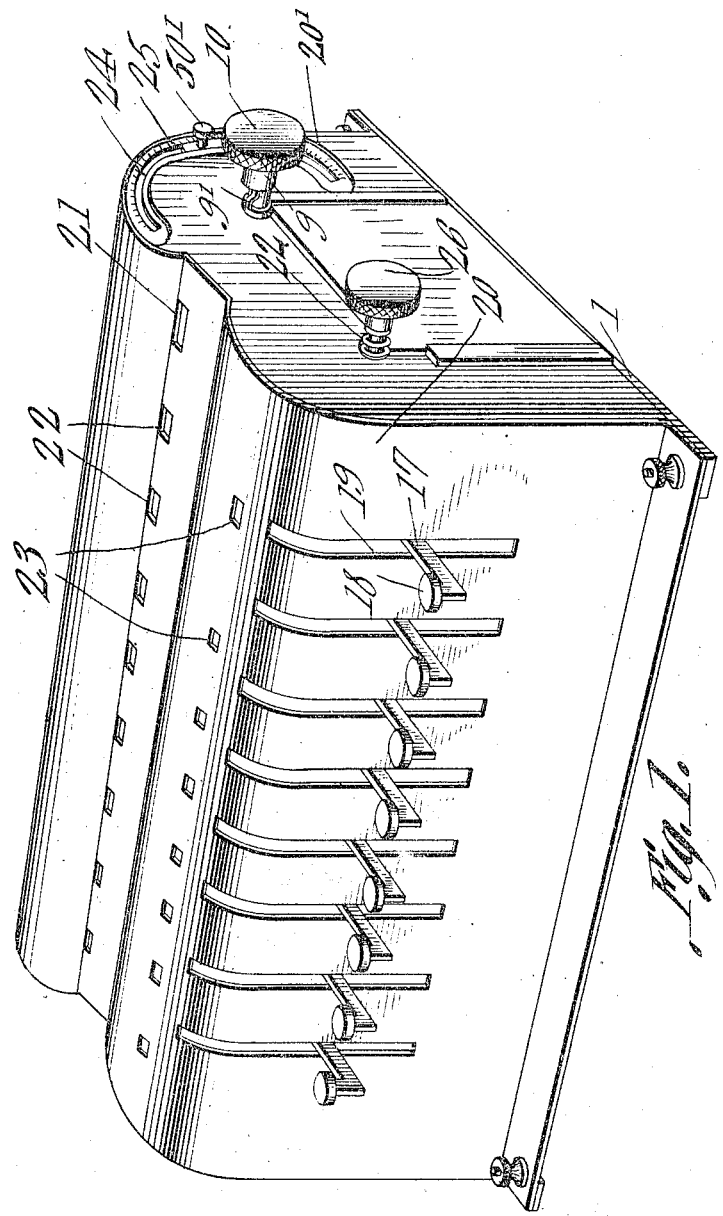

J. W. HALEY & C. B. YELTON.
REGISTER FOR LUMBER MEASUREMENTS.
APPLICATION FILED NOV. 24, 1911.

1,057,637.

Patented Apr. 1, 1913.
13 SHEETS—SHEET 1.

Witnesses

Inventors
J. W. Haley AND
C. B. Yelton
by
Attorneys

J. W. HALEY & C. B. YELTON.
REGISTER FOR LUMBER MEASUREMENTS.
APPLICATION FILED NOV. 24, 1911.

1,057,637.

Patented Apr. 1, 1913.
13 SHEETS—SHEET 2.

Witnesses

Inventors
J. W. Haley and
C. B. Yelton,
by
Attorneys

J. W. HALEY & C. B. YELTON.
REGISTER FOR LUMBER MEASUREMENTS.
APPLICATION FILED NOV. 24, 1911.
1,057,637.
Patented Apr. 1, 1913
13 SHEETS—SHEET 3.
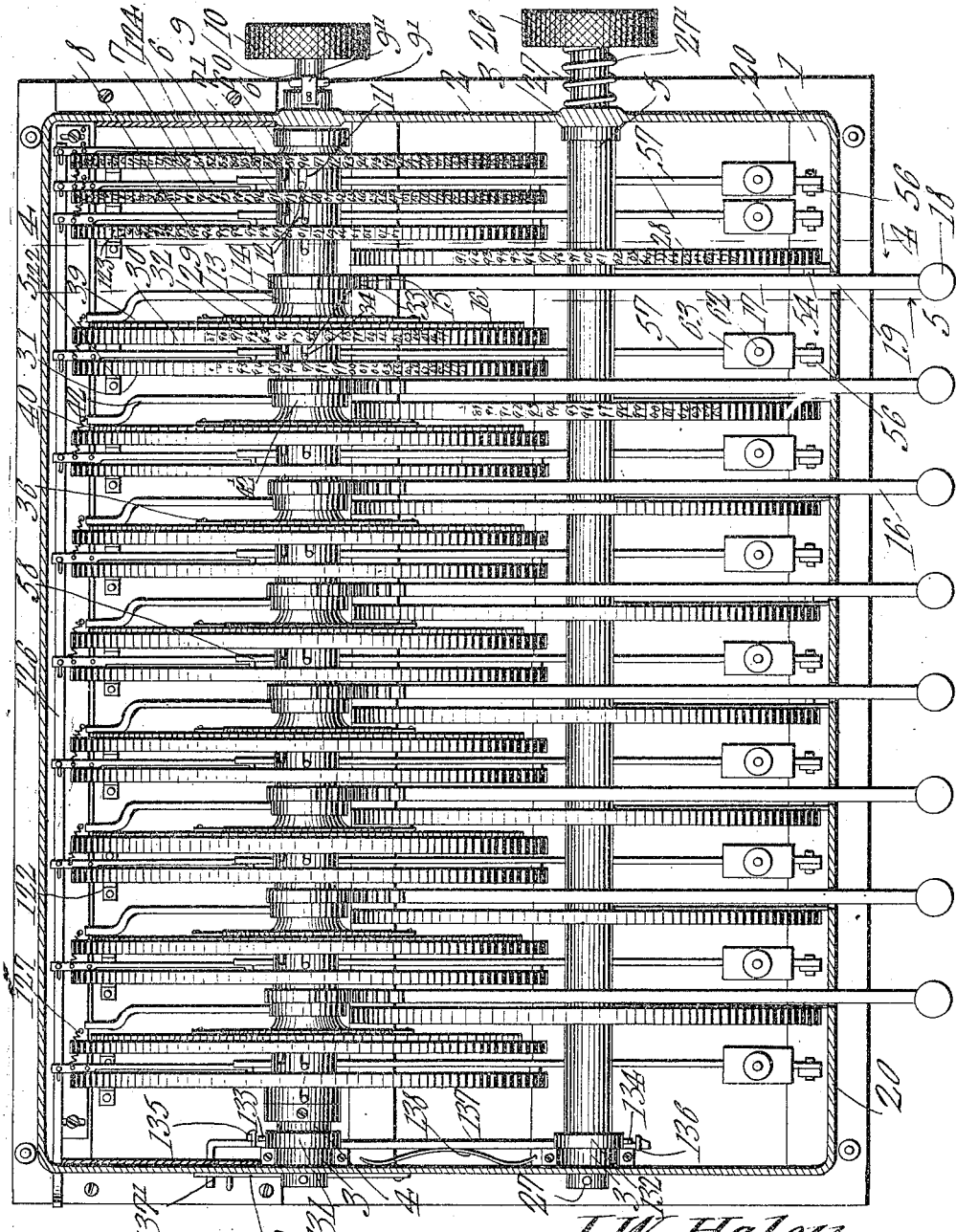

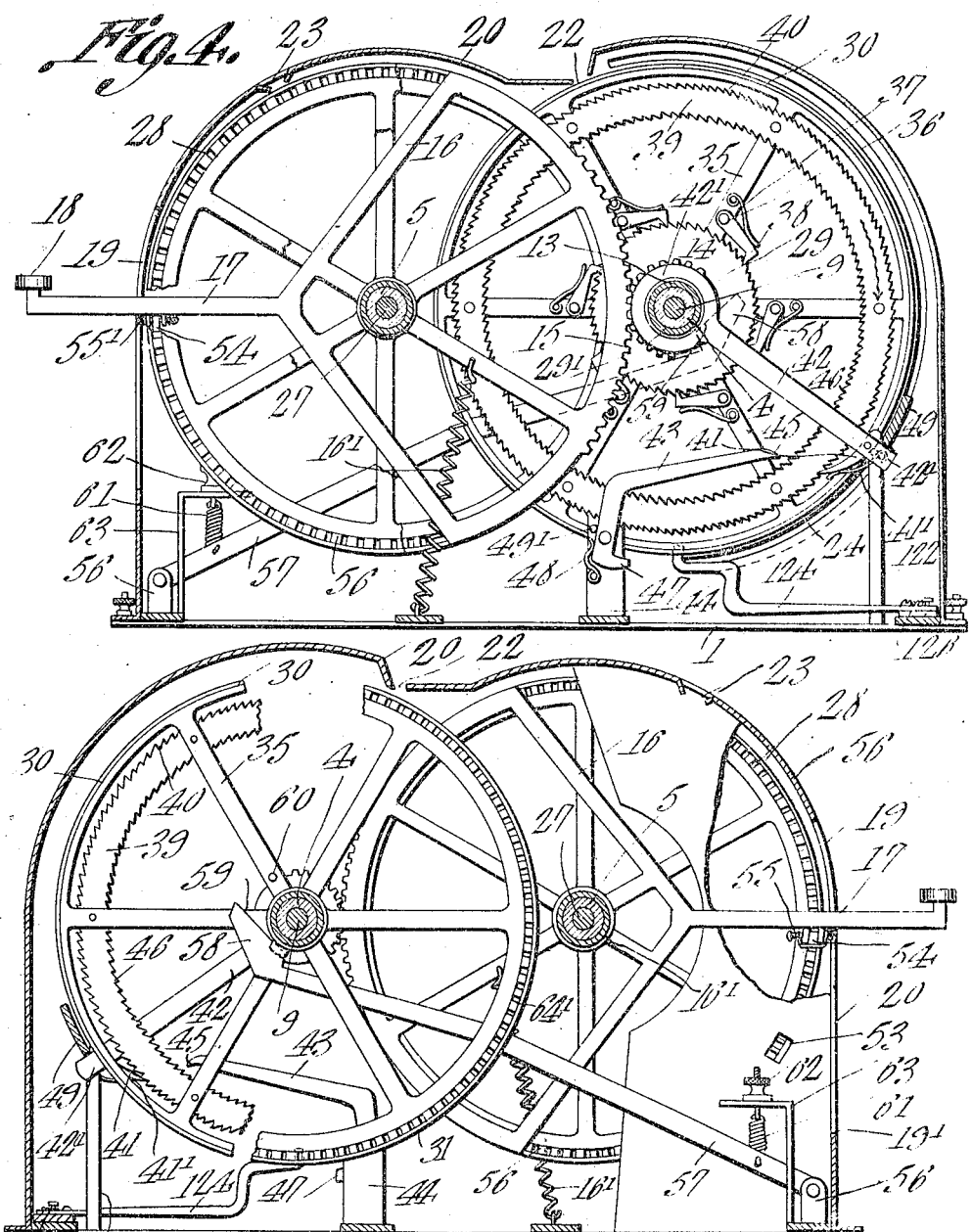

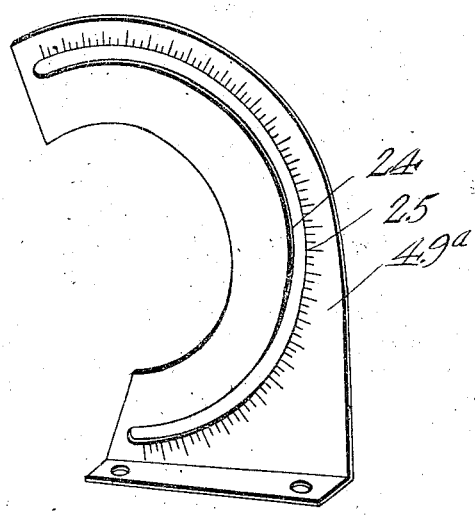
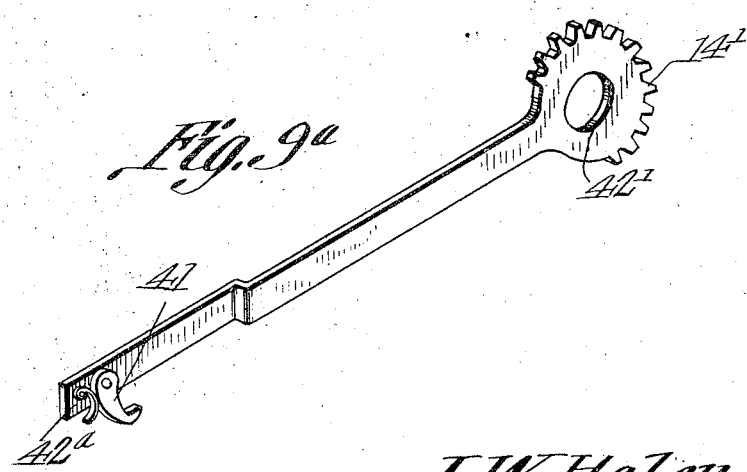

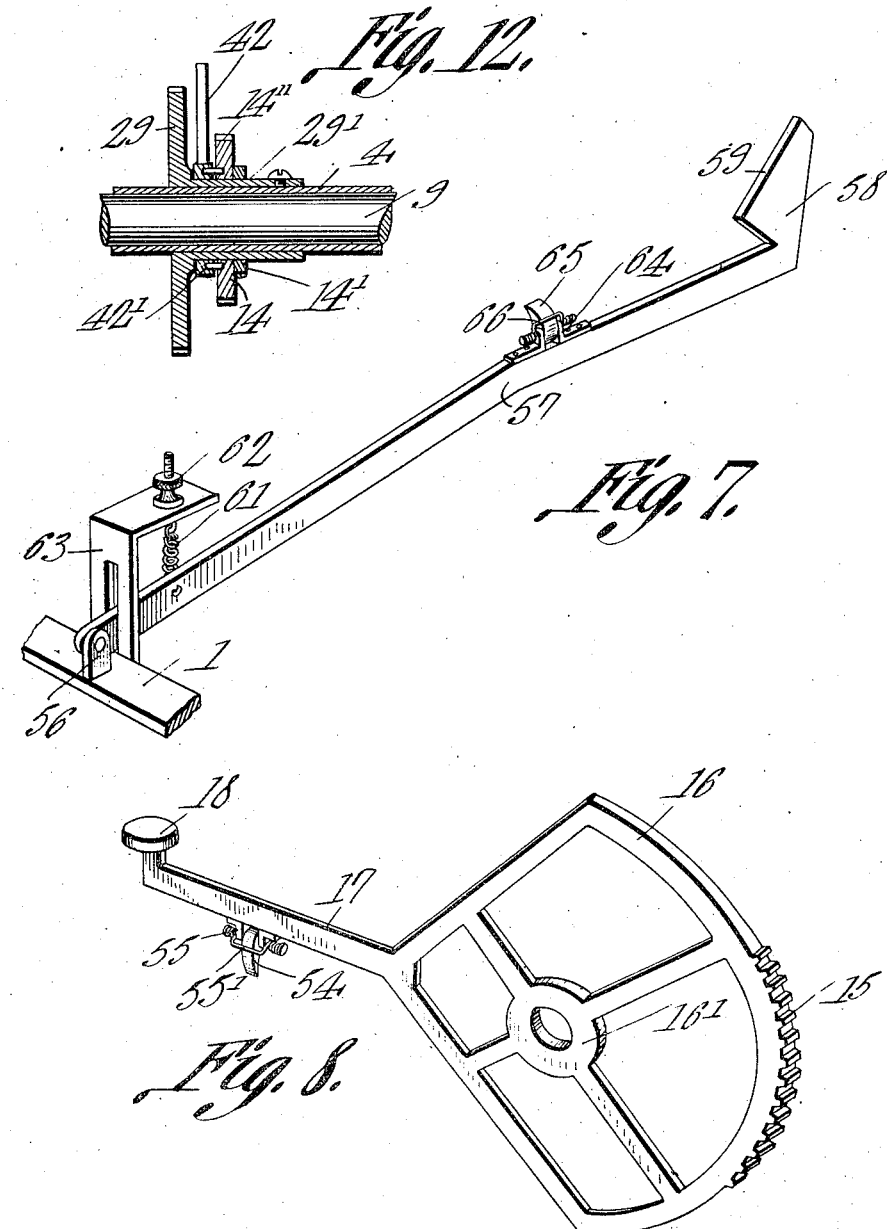

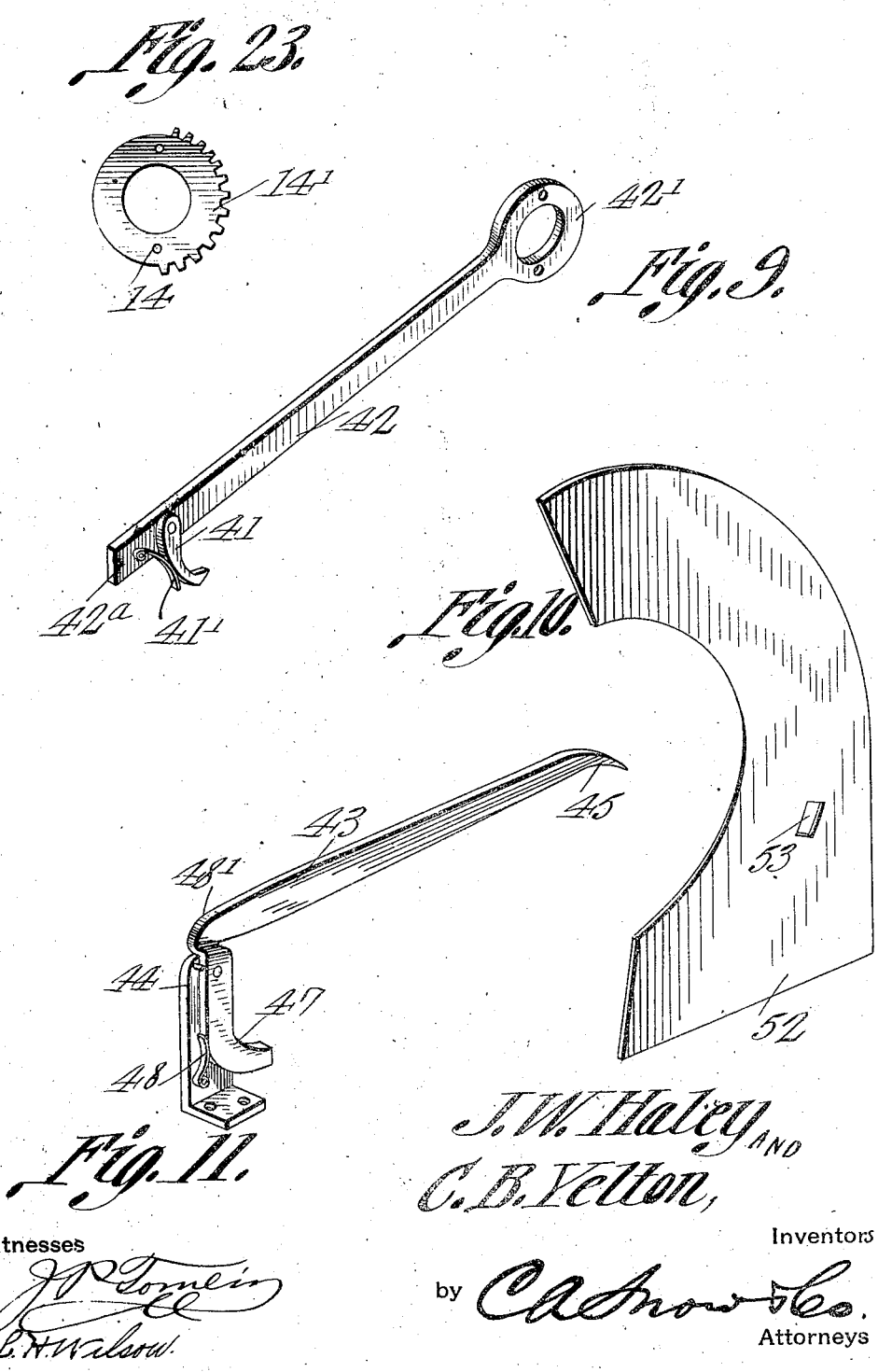

J. W. HALEY & C. B. YELTON.
REGISTER FOR LUMBER MEASUREMENTS.
APPLICATION FILED NOV. 24, 1911.

1,057,637.

Patented Apr. 1, 1913.
13 SHEETS—SHEET 3.

J. W. Haley and
C. B. Yelton,
Inventors

Witnesses by

Attorneys

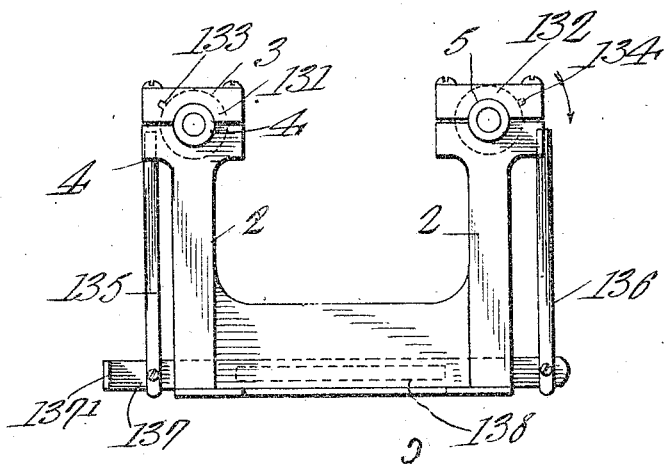

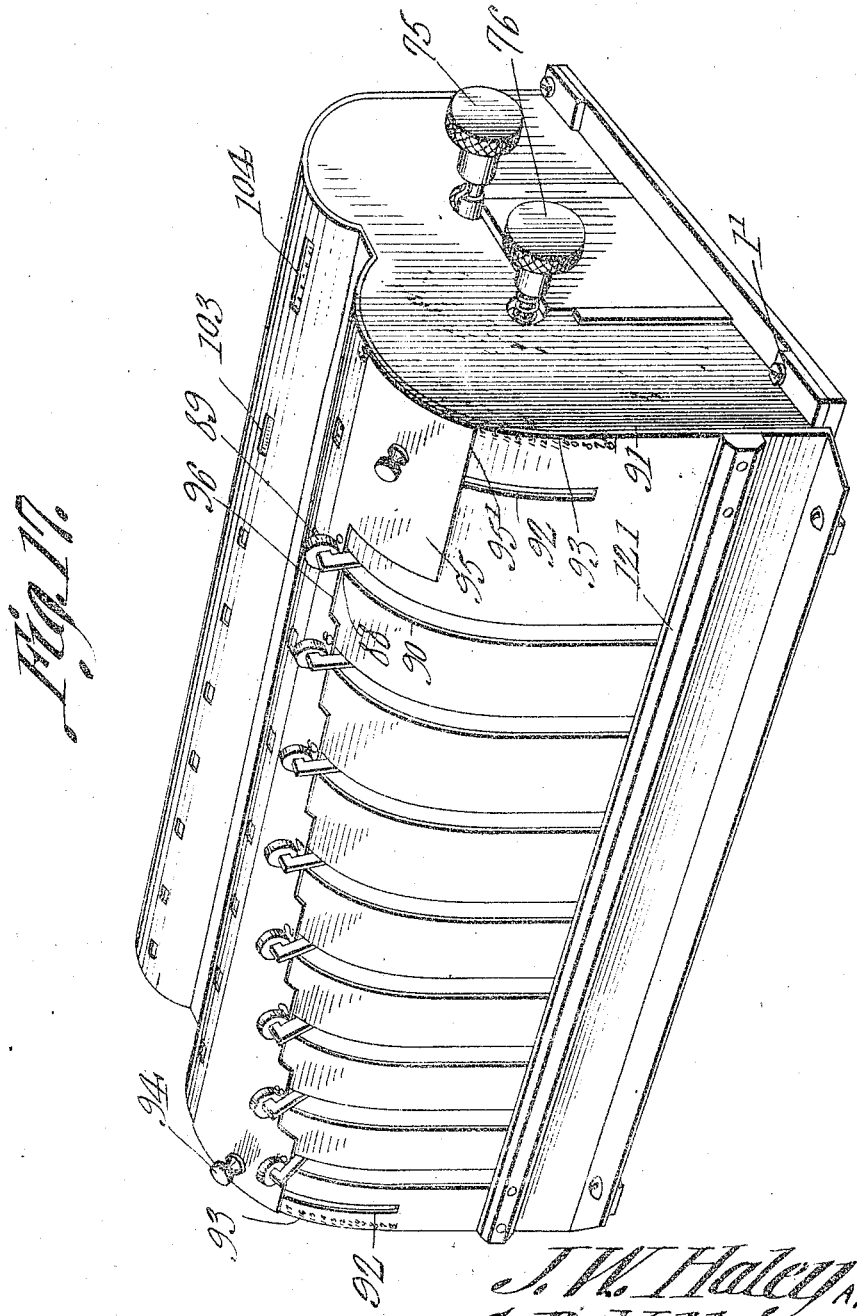

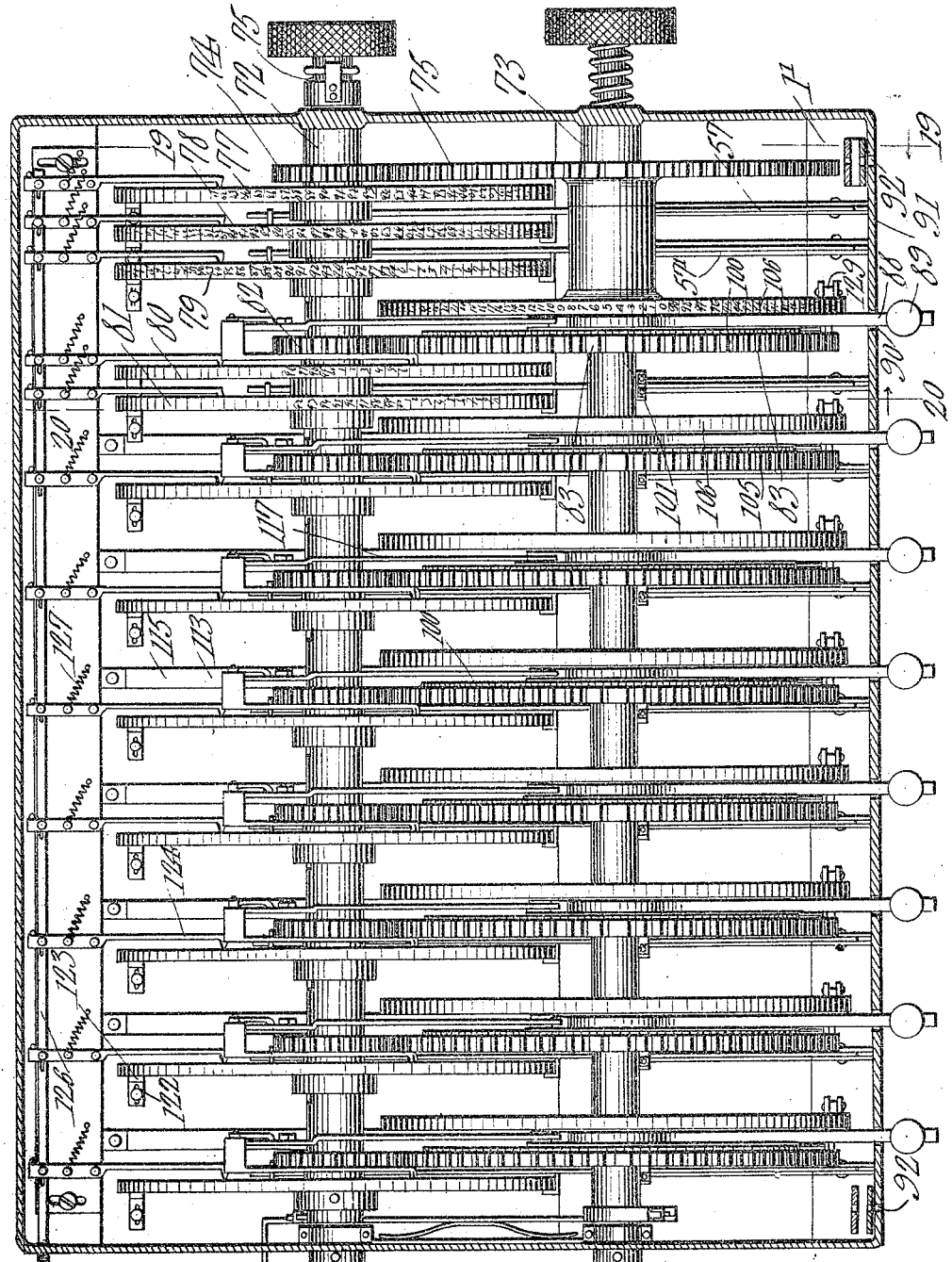

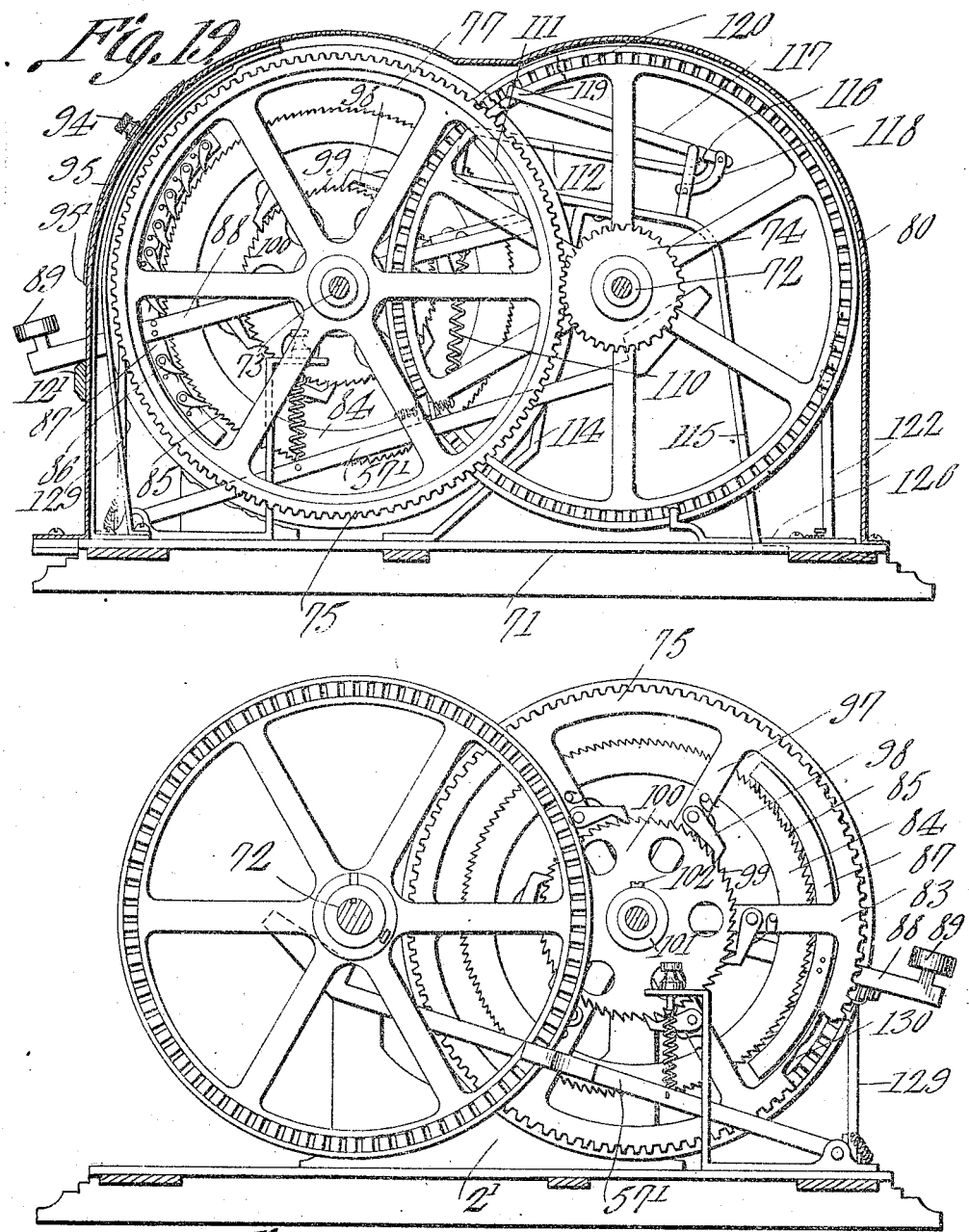

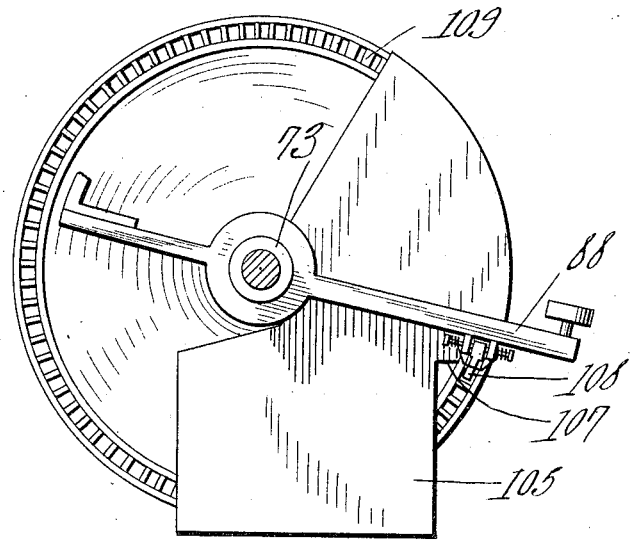
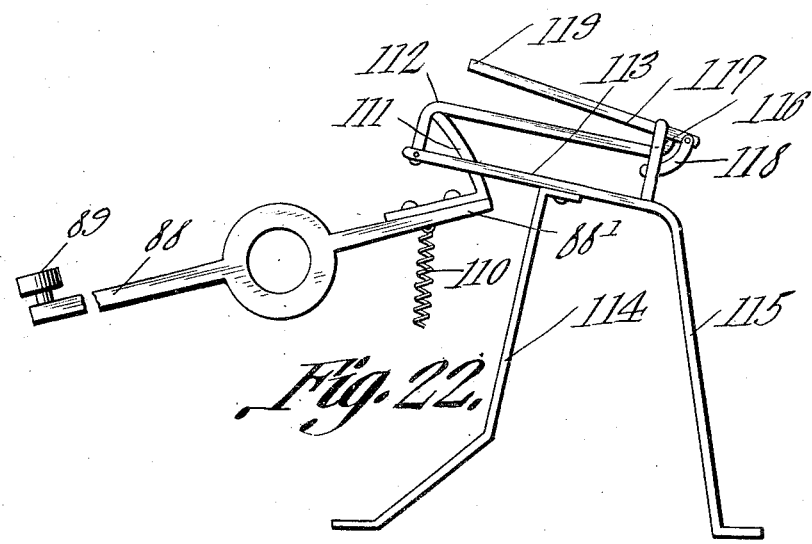

UNITED STATES PATENT OFFICE.

JOSEPH W. HALEY AND CHARLES B. YELTON, OF ERLANGER, KENTUCKY.

REGISTER FOR LUMBER MEASUREMENTS.

1,057,637.

Specification of Letters Patent. Patented Apr. 1, 1913.

Application filed November 24, 1911. Serial No. 662,225.

*To all whom it may concern:*

Be it known that we, JOSEPH W. HALEY and CHARLES B. YELTON, citizens of the United States, residing at Erlanger, in the county of Kenton, State of Kentucky, have invented a new and useful Register for Lumber Measurements, of which the following is a specification.

The present invention relates to improvements in registers for lumber measurements, the primary object of the same being the provision of a register whereby both strip count and face count as applied to dressed and matched lumber are indicated and the number of board or lineal feet is shown, the present invention being an improved construction upon the apparatus or machine as shown in applicants' Patent No. 984,908 granted to them February 21, 1911.

A further object of the present invention is to provide a plurality of measuring wheels disposed upon a shaft and so constructed as to coincidently operate a plurality or train of totalizing wheels, the said train of wheels being operated by a key depressed and spring returned mechanism which in turn releases a locking device at the initial movement of the stroke or at the final stroke thereof so as to permit the movement of the unit wheels of the respective registering and totalizing wheels, a simple device being disposed with relation to the key lever so as to limit the movement thereof and consequently the rotation of the respective unit wheels of the registering and totalizing mechanisms.

In figuring and tallying lumber, mistakes are very liable to occur and great caution is necessary to avoid mistakes since wholesale trade recognizes strip count only in the measurement of dressed and matched lumber, while the retail trade in many instances recognizes only face count. Hence the retail dealer buys ceiling, flooring and siding by strip count and sells to his customers by face count, making it necessary for him to figure the difference between the strip count and face count in arranging his profit, as well as to figure the amount of feet contained in the length necessary to fill the order as called for. This means calculating by fractions, which vary with different kinds of lumber, and so the likelihood of mistakes is constantly present. As lumber is made up into stock sizes of different lengths and widths and usually runs a certain number of feet to the bunch, this application is made to dressed and matched lumber and not to rough lumber. With the structure hereinafter set forth, the operator to fill an order has but to move levers or like devices representing different widths and lengths of lumber until the total number of feet wanted is indicated on a totalizing register, and then on other indices will be shown the number of bunches, or tallies, of lumber of different lengths and both the face and strip count will be shown. The operator then has but to select the indicated number of bunches of the indicated lengths to fill the order and may then readily calculate the price.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 2:
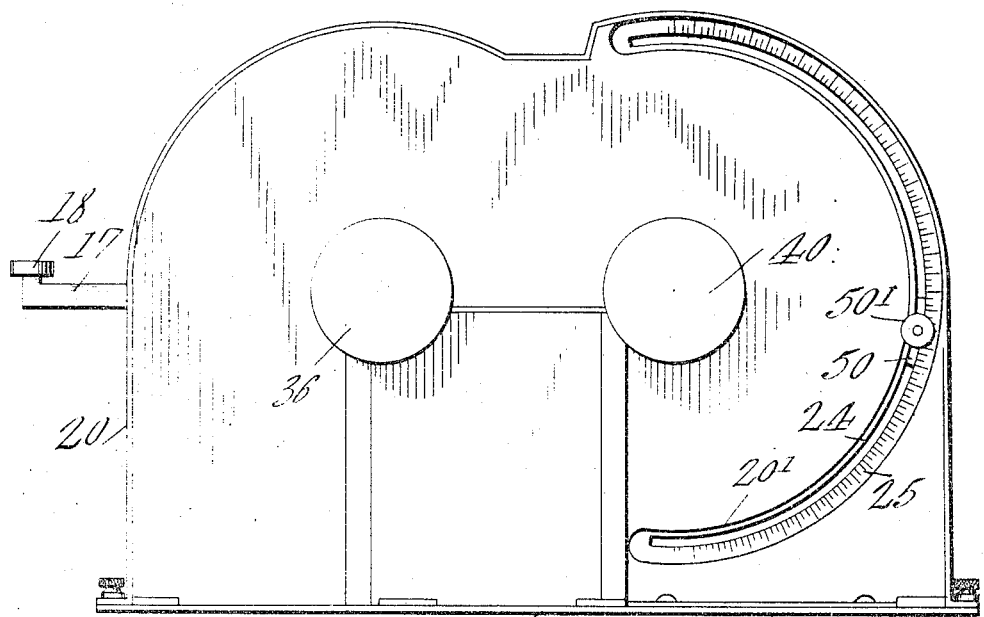
Figure 6:
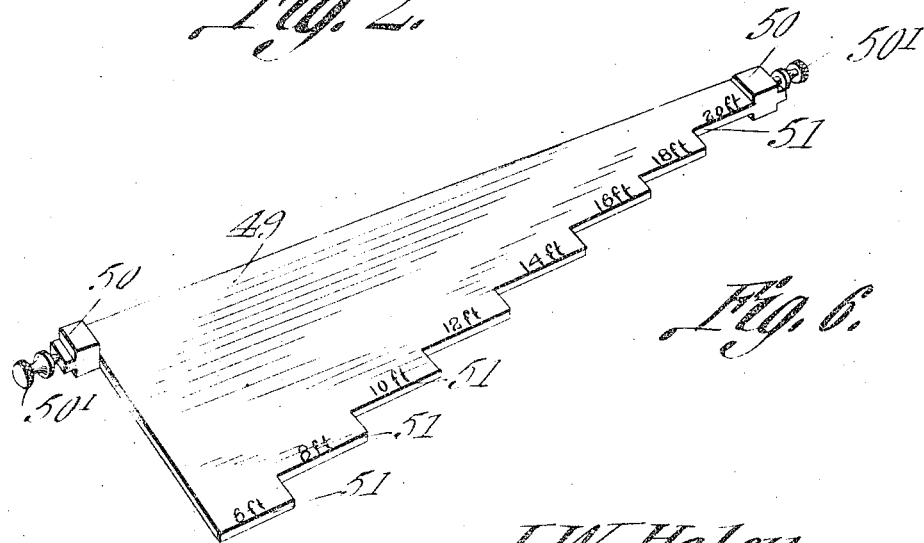
Figure 13:
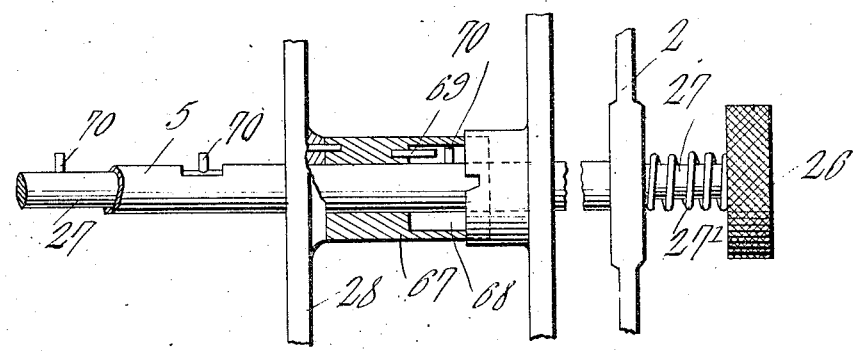
Figure 14:
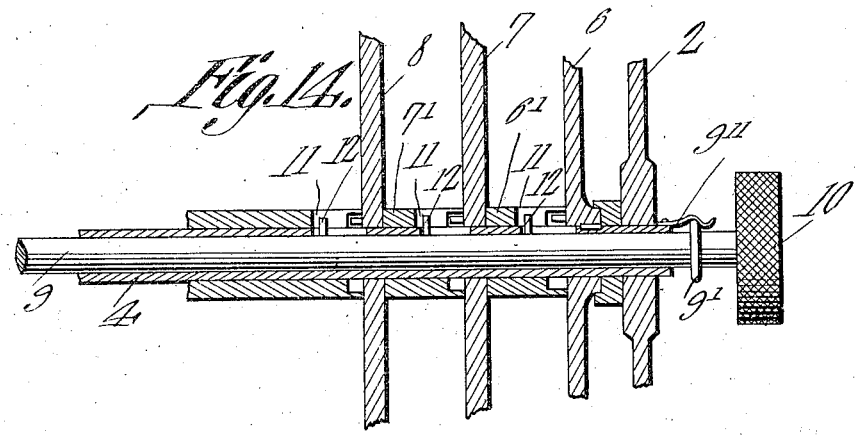

In the drawings—Figure 1 is a perspective view of the complete apparatus in its preferred form. Fig. 2 is a view in elevation taken from the right hand end thereof. Fig. 3 is a top plan view of the registering, totalizing and tallying mechanism with the operating mechanism, the casing of the machine being removed. Fig. 4 is a cross section taken through the machine at one side of the operating segments showing the parts in the position they assume just prior to the depression of a key lever. Fig. 5 is a similar view taken from the opposite side of the unit registering wheel. Fig. 6 is a perspective view of the adjustable strip for regulating the distance of actuation or rotation of the primary wheels of the registering wheels and consequently the unit wheel or primary wheel of the totalizing wheels. Fig. 6ᵃ is a detail perspective view of one of the supports for the adjustable strip. Fig. 7 is a perspective view of the complete spring actuated lever disposed between the primary wheels of the respective sets of totalizing and registering wheels for actuating the adjacent wheel at each revolution of the primary wheel. Fig. 8 is an enlarged perspective view of the key lever actuated segment. Fig. 9 is a perspective view of the lever or arm that regulates the movement or distance the primary wheel of the registering wheels is moved at the depression of the key lever. Fig. 9ª is a similar view of a modified form of lever as seen in Fig. 9, the modified form having operating ratchet teeth formed integral with its connecting collar or disk. Fig. 10 is a perspective view of a shield employed and disposed adjacent the key lever between said key lever and the tallying wheel to permit the key lever to actuate said tallying wheel. Fig. 11 is a perspective view of the pawl or detent for locking the primary wheel of the registering wheels at the final stroke of the lever as viewed in Fig. 9. Fig. 12 is a section taken through the main shaft adjacent the primary or unit wheel of the registering mechanism showing the main gear and operating lever in operable relation thereto. Fig. 13 is an enlarged view showing the clutch mechanism used on the forward shaft of the apparatus to permit the returning of the tally wheels to initial or zero position. Fig. 14 is a similar view of the clutch mechanism used in connection with the rear shaft carrying the totalizing and registering wheels. Fig. 15 is a view similar to Fig. 4 with parts in the position they assume at the final depression of the key lever. Fig. 16 is a plan view of the standards for journaling the shafts of the machine. Fig. 17 is a perspective view of an apparatus constructed and embodying a modified form. Fig. 18 is a top plan view of the operating mechanisms contained in said casing with the casing removed. Fig. 19 is a section taken on line 19—19 of Fig. 18. Fig. 20 is a section taken on line 20—20 of Fig. 18. Fig. 21 is an elevation of the key lever and lock releasing mechanism used in connection with the structure shown in Fig. 18. Fig. 22 is a detail elevation showing said key actuated mechanism in connection with the lock and its release.

Referring to the drawings and more particularly to the apparatus or device as shown in Figs. 1 through 16, the numeral 1 designates the lower base or frame which has connected thereto at the opposite short ends thereof, and extending upwardly and in parallel the two pairs of vertically disposed standards 2, which constitute a frame for the support of the respective shafts of the device, the upper end of said standards being provided with journal boxes 3 in which are rotatably mounted the hollow rear shaft 4 and the hollow forward shaft 5, respectively.

Mounted rotatably upon the rear shaft 4 are the three totalizing wheels 6, 7 and 8, the respective wheels 6 and 7 having disposed therebetween the bushings 6' and 7' respectively.

Mounted for sliding movement within the tubular shaft 4 the full length thereof, is a reduced shaft or rod 9, having the milled operating wheel 10 at the right hand end thereof as viewed in Figs. 1, 2 and 3. This shaft or rod 9 constitutes a clutch device whereby the respective wheels mounted upon the rear shaft 4 may be locked for rotation with the respective shaft 4 and may be permitted to rotate freely as will presently appear. The shaft or rod 9 is provided with the shouldered portion 9' which coacts with the spring 9'' to hold the shaft seated so that the projection or pin 12 carried by the said shaft or rod 9 will properly seat within the slot 11 of the respective bushings or rings 6' and 7' whereby when the parts are in the position as shown in Fig. 2, the primary or unit totalizing wheel 6 will be keyed to the tubular shaft 4 so that the rotation of the shaft, as will presently appear, will rotate the said primary wheel 6 coincidently with the rotation of the unit or primary wheel 30 of the registering device, to be more fully described hereafter.

Carried upon the tubular shaft 4 to the left of the totalizing wheels 6, 7 and 8 as viewed in Fig. 3, is a shoulder or hub 13 which carries a disk 14 which is provided with a plurality of teeth 14' which are at all times in mesh with the teeth 15 of the segment 16, said segment 16 being journaled at 16' upon the tubular shaft 5; and formed integral with the said segment 16 is a lever 17 which is provided upon its outer end with a key 18, said lever 17 being projected through one of the respective vertical slots 19 of the inclosing metallic casing 20. By this means it will be seen that the depression of the key 18 will actuate the lever 17 to impart a movement to the segment 16, the teeth 15 operating the said disk 14 so as to rotate the shaft 4 and consequently the unit wheel 30 of the respective registering wheels and the unit or primary wheel 6 of the totalizing mechanism.

The inclosing casing 20 as shown in Fig. 1 is provided with the two segmental or arcuate slots 20', in its ends and an elongated aperture 21 which is disposed above the respective totalizing wheels 6, 7 and 8 so that the desired numerals carried upon the respective wheels are visually exhibited through said aperture, while the plurality of apertures 22 are formed in line with the aperture 21 and are directly above the respective registering wheels 30 and 31 of the various sets or series, there being a separate set or series to each respective key 18, and as viewed in Figs. 1 and 3, a total of eight sets. In the forward portion of the casing adjacent to the upper ends of the vertical slots 19, are apertures 23, there being a similar number to the apertures 22, said apertures 23 being disposed above to visually exhibit the numbers carried by the tallying wheel 28, the purpose of which will presently appear.

Disposed for sliding movement within the tubular shaft 5 of the apparatus, is a shaft or rod 27 normally held extended, as viewed in Figs. 1 and 3, by means of the spring 27', a milled disk 26 being connected to the outer end of said shaft or rod 27 so that the same may be manually manipulated, the sleeve 67 of the tally wheel 28 being provided with a receptacle or recess 68 in the outer end thereof and having mounted therein a horizontally disposed pin 69, which is adapted to be projected in the path of and to engage the upstanding pin 70 of the rod or shaft 27, so that when the said shaft 27 is depressed or pushed inwardly, the said pin 70 will engage the pin 69 so that the tally wheel 28 may be returned to initial or zero position, the purpose of which will presently appear.

As shown two registering wheels 30 and 31 are provided in each set, a gear 29 having its sleeve 29' secured rigidly to the shaft 4 being disposed in operable relation to the respective primary wheels 30 of the registering sets, while the hub 32 upon the opposite side of the wheel 30 of each registering set, is provided with a slot 33 in which is mounted the pin 34 carried by the shaft 9, this construction permitting the pulling out of the shaft 9 so that the spring 9'' is disengaged from the rib 9' to permit all of the respective wheels of the registering sets and the totalizing sets to be simultaneously returned to initial or zero position.

As clearly shown in Fig. 12, the disk 14 is mounted upon the sleeve 29' and is held against movement by means of the collar 14', while disposed upon the respective spokes 35 of the primary or unit wheel 30 of each registering set, is a ratchet or pawl 36, held normally in engagement with the periphery of the gear or ratchet wheel 14 by means of the spring 37, each pawl or ratchet being provided with the pointed end 38 which is disposed in operable position at all times, as clearly shown in Fig. 4. Secured to the said spokes 35 upon the same side as the ratchet 36 and concentric to the periphery or rim of the said wheel 30, is a band 39 provided with the exterior ratchet teeth 40, which are disposed for coöperation with the pivoted pawl or detent 41, which is held normally in engagement with said teeth 40 by means of the flat spring 41', said detent or pawl 41 being carried in the outer end of the respective levers or arms 42, whose band 42'' is mounted upon the sleeve 29' keyed to the hub of the ratchet or gear wheel 29. By this construction it will be seen that the depression of the key lever 17 will cause the rotation of the primary or unit wheel 30 in the direction of the arrow Fig. 4, and consequently cause the said arm 42 to be moved in the direction of the arrow, and as the pawl 41 is thrown into engagement with the teeth 40 of the band 39, the said primary wheel 30 is rotated in the direction of the arrow and a predetermined distance, as and for the purpose hereinafter described.

Connected to the base of the machine and standing upwardly therefrom, one to each unit or primary wheel of the registering set, is a support 44 which has mounted therein, the pivoted arm, lever or pawl 43, whose pointed end 45 is disposed above, but in the position to be depressed to engage any of the respective teeth 46 carried upon the inner edge of the band 39, the said teeth 46 being set or oppositely disposed to the teeth 40 of said band, so that when the lower end 42ª of the lever or arm 42 is moved so that it will engage the projection 47 of the pawl 43, the said pawl 43 will have its hooked or projecting end 47 moved in opposition to the spring 48, so that the pointed end 45 will be depressed and thrown into engagement with one of the teeth 46 of the band 39, and thus consequently stop or lock the said wheel 30 against further movement in the direction of the arrow. In order to limit the upward movement of the said pawl 43, a stop 49' is carried by the post 44, all as clearly shown in Figs. 4 and 11. By this construction it is evident that the depression of the key 18 and the operation of the segment 16, will rotate the unit or primary wheel 30 of its respective registering set in the direction of the arrow as viewed in Fig. 4, and to a position as clearly shown in Fig. 15, but in order to regulate the distance which the arm 42 will travel, or in other words the position from which it will start and thereby regulate the distance of travel of the unit or primary wheel 30 of the respective sets, a regulating bar or plate 49 is disposed longitudinally of the machine, (a detail structure of this plate being clearly shown in Fig. 6,) so that its projections or trunnions 50 will be slidably mounted in the arcuate slot 24 formed in the respective supports 49ª (Fig. 6ª) and provided with the graduated scales 25 whereby the positioning of the said plate or strip 49 may be regulated to an exactness. By means of the locking nuts 50', the said plate or strip 49 may be locked in the desired position, so that the respective stepped or staggered portions or planes 51 upon the lower edge of the said plate or strip 49 will be disposed in proper relation to the upper sides of the respective ends 42ª of the levers or arms 42, of each respective registering set. Thus when the spring 16', connected to the base and segment 16 of the respective registering sets, automatically returns the key lever 17 to its upward position, the abutting of the end 42ª of the lever 42 against its respective shouldered or staggered portion 51 of the adjusting and regulating strip or plate 49 will regulate the height of lifting of the lever 17, all as clearly shown in Figs. 4 and 15. By this means it will be seen that the depression of the key lever 17 is regulated entirely by the adjustment of the adjusting plate 49 and the coaction thereof with the operating lever 42, which when returned by the spring 16' will assume a position to abut its respective projection 51 of the adjusting strip 49 and thereby regulate the position of the key lever 17 within its respective slot 19 of the casing.

The mechanism for operating the respective wheels 7 and 8 of the totalizing mechanism from the primary or unit wheel 6 is identical with the mechanism adapted for operating the respective wheels 31 of the registering wheels from the wheel 30, and may be so constructed that the rotation or movement of the respective wheels 7 and 8, or 31, may be moved one space or more at a time, either every revolution of the respective primary wheels 6 or 30, the outer faces of the respective unit or primary wheels being numbered from one to ten if desired or one to a hundred and so on. In the present instance the construction is designed for the placement upon the unit or primary wheels numerals from naught to ninety-nine having one hundred spaces thereon, and whereby the single rotation of the respective unit or primary wheels will move the respective adjacent wheels 7 and 8 of the totalizing wheels or the wheels 31 of the registering wheels one notch to every revolution of the unit or primary wheel, thus displaying upon the respective wheels units of 100, as each unit or primary wheel during one revolution, will register 99.

The mechanism for producing this result is clearly shown in Figs. 3, 4, 5 and 7 and comprises a projection or stud 56' connected to the forward plate of the base 1, and has pivoted thereto one end of the long lever or arm 57 to dispose it so as to have its hooked end 58 adjacent the left hand face, as viewed in Fig. 3, of the respective unit or primary wheels 6 and 30. It is to be understood that where two or more wheels are used that there is one less lever 57 than are number of wheels, thus in the totalizing mechanism where three wheels are shown, there are two levers while in the registering mechanism where two wheels are shown, there is one lever 57. Carried by the respective unit wheels upon the left hand face thereof and disposed in the path of the inclined portion 59 of the hooked end 58 of the lever 57, is a pin 60, which once every revolution of the wheel bearing the same will engage the said inclined face 59 of the lever 57, and depress the free end thereof against the tension of the spring 61, which is adjustably connected by means of the screw and thumb nut 62 from the bracket 63 connected to the base 1 and so as to cause the pawl 65 carried in the eyed lugs 64 and held into proper engagement by the spring 66 with the teeth 64' of the adjacent wheels 7 and 8 of the totalizing mechanism, and the wheel 31 of the registering mechanism so that the said wheel actuated by the depression of the lever or arm 57 will be moved one tooth at a time each depression of the free end of the lever 57 and consequently each revolution of the respective wheels 6 or 7, as viewed in the totalizing mechanism, Fig. 4, or each revolution of the wheel 30 as in the registering mechanism.

In order to operate the tally wheel 28, the same is provided with a plurality of ratchet teeth 56 near the periphery thereof. Disposed upon the base 1 between the lever 17 and the respective tally wheels 28 of each set of registering wheels, is a plate 52 which forms a shield upon which the free end of the pawl 54 slides. This pawl 54 is mounted in the lugs 55 and is carried by the key lever 17, the spring 55 normally holding the free end of said pawl 54 against and in contact with the said shield 52, so that when the said key lever 17 is depressed, and reaches the lowermost position which is regulated by the striking of the abutting end 42ᵃ of the lever 42 against the hooked end 47 and the depression of the pawl 43 and also the lower end 19' of the respective slot of the casing, the end of the pawl 54 will project into and through the aperture 53 formed in the shield 52 and will engage one tooth 56 of the wheel 28 and thus move the said wheel 28 the distance of one notch or tooth 56, at each depression of the key lever 17. By this means every depression of the key lever 17 in each set of registering mechanisms is kept tab or tally upon by means of the wheel 28, the numerals carried upon the periphery thereof as before stated being visually exhibited through the respective apertures 23 of the casing 20. By this means it is evident that the tally or total of depressions of the respective key lever 17 will be kept visually before the operator through the apertures 23, while all of the respective apertures 22 will exhibit the peripheries of the registering wheels 30 and 31 and thereby show the total of the respective registrations upon the respective sets of registering wheels, while through the aperture 21 will be exhibited the total of all of the visually exhibited registering wheels, thus giving to the dealer the visual exhibition of the number of bundles of material through the apertures 23, the number of feet in the respective numbers of bundles through the respective apertures 22, and the total number of feet through the aperture 21.

As clearly shown in Fig. 6, the adjusting or regulating plate 49 has marked adjacent to the respective staggered portions 51, numerals designating the measurement that each respective registering set of wheels is designed to register, thus the longest projection will register bundles containing strips 6 feet long and throughout until the shortest one will register strips 20 feet long.

In the structure as shown in Figs. 17 through 22 a slight modification is resorted to, the mechanism being actuated in a similar manner and to produce the same results. This particular mechanism comprises the frame 1' having the standards 2' with their journals 3' which are similar to the standards and journals 2 and 3 of the frame of the mechanism first described, while journaled in the respective standards are the tubular shafts 72 and 73 respectively, which correspond to the shafts 4 and 5 heretofore described. Each one of these tubular shafts are provided with the milled disk operated clutch mechanisms 75 and 76 which has keyed thereon the respective small gear 74 and large gear 75, so that the rotation of the gear 74 will impart rotation to the gear 75' from the shaft 72 to the shaft 73. Mounted upon the shaft 72 are the respective wheels 77, 78 and 79 of the totalizing mechanism, while disposed in the same position thereto as in the description heretofore given of the device, are the registering wheels 80 and 81 which are arranged in sets similarly, as heretofore described. A similar mechanism as 57, in the form of levers 57' are employed to impart movement to the respective wheels 78 and 79 of the totalizing mechanism due to the revolution of the wheel 77 thereof, while the wheels 81 of the respective registering mechanisms are operated through a similar medium by means of the primary or unit wheel 80 of the respective registering sets.

Properly fastened upon the shaft 72 adjacent to the respective unit wheels 80 of the registering sets is a gear 82, which meshes at all times with a large gear 83 rotatably mounted upon the forward shaft 73, said gear wheel having placed upon the spokes thereof a band 84 provided with the peripheral teeth 85, which are disposed in path of to be engaged by the plurality of ratchets 86 carried by the curved or segmental strip 87 made fast to the respective key levers 88, the said key levers 88 being projected through the slots 90 in the forward portion of the casing 91, so that the keys 89 of the respective key levers will be in operable position at all times, as viewed in Figs. 17, 19 and 20. It will thus be seen that by depressing the key levers 88 of the respective registering sets, that the pawls or ratchets 86 will engage the teeth 85 of the band 84 and thus rotate the gear wheel 83 and impart a consequent rotation to the small gear 82 of the respective unit or primary wheels 80 of the registering sets, and that in order to limit the upward movement of the respective key levers 88 and therefore the desired rotation of the respective unit wheels 80 of the registering sets and the coincident movement of the unit wheel 77 of the totalizing set, the adjusting strip 95 is disposed upon the exterior face of the casing 91 so that the set screws 94 thereof may be engaged in the face of the casing adjacent the slots 92 of the casing to lock the said strip 95 in the desired position longitudinally of the casing so that the staggered or projecting portions 96 upon the lower edge of said strip 95 will be disposed to limit the length of the respective slots 90 and therefore the consequent upward movement of the respective levers 88, a gage or scale 93 being formed or exhibited upon the edge of the casing 91 near the extreme ends thereof so that the lower edge of the plate 95, at 95' may be positioned or read so that the numerals in the scale 93 adjacent thereto may be selected according to the desired measurement to be given the material. By this means as before stated, the said strip 95 will limit the upward movement of the respective levers 88 so that they may be given a full movement of the respective slots 90 during the depression or only a short movement according to the desired measurements.

Keyed upon each shaft 73 upon the left hand face of the respective large gears 83 is a bushing 101 by means of a screw 102, said bushing carrying a ratchet disk or wheel 100, so that its teeth 99 are disposed in the path of the respective spring actuated ratchets 98 carried by the spokes 97 of the said gear 83, this construction being provided so that the rotation of the gear 83 due to the depression of the respective key levers will impart rotation through the said disk 100 to the shaft 73, such rotation rotating the large gear 75' which meshing with the gear 74, will rotate the unit or primary wheels 77 of the totalizing mechanism, thereby providing coincided movement between the said unit or primary wheel 77 of the totalizing mechanism and the movement of the respective key levers 88 of the respective registering mechanisms. By this means the movement of any of the respective key levers will actuate the totalizing wheels so that the totals exhibited by the respective registering wheels through the apertures 103 of the casing 91 will be exhibited through the aperture 104 in said casing.

In order to tally or keep registration of the number of times the respective key levers 88 are depressed, and in the present instance keep a tally or total upon the respective bundles of lumber registered, a shield 105 is disposed between the respective tally wheels 106 and the key levers 88, the same being provided with a cut-out portion 107 in the lower edge thereof to have the spring actuated pawl 108 carried by the respective key levers 88 projected therethrough to engage the teeth 109 of the said tally wheel to move the tally wheel one movement every movement of its respective key lever. This construction is somewhat similar to the construction heretofore described.

When it is desired to return all of the respective registering and totalizing wheels to zero, it is simply necessary to actuate the clutch wheel 76 to outward position at which time the said wheel may be rotated in the direction of registration position and cause the simultaneous movement of all of the registering, totalizing and tally wheels to initial or zero position. At the same time the clutch wheel 76 may be depressed inwardly so as to permit the free rotation of the tally wheels without effecting the ratchet controlled mechanisms of the various wheels 83.

Connected to the inner free ends 88' of the respective key levers 88 is a spring 110 which normally holds the end downwardly and the key 89 upwardly. When the said key 89 is depressed the hook lug 111 carried by the inner end 88'' of the said key lever is moved upwardly to engage the pivoted arm or lever 112 connected in the free end 113 of the respective frames 114 and 115 mounted upon the base of the machine to the right of the unit wheels 80 of the respective registering wheels as viewed in Fig. 18. This movement raises the lever 112 so that its outer end 116 will lift the lever 117 journaled in the curved bracket 118, but its outer end 119 will be thrown upwardly as viewed in Fig. 19 to abut one of the teeth 120 of the unit or primary wheel 80 of the registering mechanism and thereby stop the rotation of said wheel at the extreme downward stroke of the key lever 88. Upon the movement of the key lever upwardly due to its spring 110, the lever 117 will drop downwardly and out of engagement with the respective tooth 120 of the wheel 80, but will always actuate to lock the wheel against movement at the final depression of the said key 88. By this means the respective wheels 80 of the registering mechanism are free to move at the movement or first depression of the respective keys 88 but are locked against movement when the lower edge of the said key levers 88 will abut the plate 121 disposed longitudinally of the forward portion of the casing 91 at the lower ends of the vertical slots 90. It will thus be seen that all of the said key levers have the same downward limitation but by reason of the staggered faces or edges 96 of the regulating strip 95 may be lifted to various positions, it being for the same purpose as heretofore described with relation to the strip 49.

Carried by the left hand standards 2' (Figs. 3 and 16) is a slidable bar 137, whose hooked end 137', projects exterior of the casing 20 and is disposed to be engaged by a pivoted catch 139 carried by the casing. When locked the vertical rods 135 and 136 are in neutral position, but when the bar 137 is pushed forwardly, the upper end of the rod 135 in line to be abutted by the pin 133 carried by the collar 131 upon the shaft 4. By this means the shaft 4 is locked against movement in the direction of the arrow Fig. 16. When the bar 137 is moved backwardly to its limit the upper end of the rod 136 is placed to be engaged by the pin 134 of the collar 132, so that the shaft 5 cannot rotate farther in the direction of the arrow Fig. 16. The spring 138 acts as a retarding or brake device for the sliding bar 137.

In order to prevent the respective wheels of the tallying and registering mechanisms from spinning and consequently moving too far, a brake device is employed which consists of the respective inwardly projecting spring arms 122 each of which is provided with the damper or brake 123, these arms being disposed upon the left hand side of the respective wheels as viewed in Figs. 3 and 18, while mounted or pivotally connected to the frame of the machine and disposed for engagement upon the opposite sides thereof, are the pawls 124 which engage the teeth upon the right hand face of the respective wheels of the totalizing and registering sets, thus preventing the spinning movement or any retrograde movement of said wheels. When it is desired to return all of the totalizing and registering wheels to initial or zero position, the rod 126 is pulled upon thus releasing all of the said pawls from the respective wheels so that when the respective milled disks are operated when the clutches have been thrown out, all of the said wheels may be returned to the said initial or zero position, the springs 127 being provided to hold the release bar heretofore mentioned to the right as viewed in Figs. 3 and 18 so as to hold their respective pawls 124 in engagement with the respective wheels of the totalizing and registering sets.

In order to lock the tallying wheels of the apparatus as shown in Fig. 18 from a retrograde movement, a pawl 129 is employed and disposed to coöperate with the peripheral teeth 130 formed upon the right hand face of the said tally wheel of each registering set.

As before stated, the peripheries of the various registering, totalizing and tally wheels have disposed thereupon for visual display through the respective apertures of the casing, a plurality of numbers disposed in succession and said numbers may be arranged in series from 0 to 99 upon each of the respective wheels so that in the registering wheels where two wheels are used the highest total possible for registration thereon would be 9,999, whereas in the totalizing wheels where three registering or totalizing wheels are employed, the highest attainable or visually exhibited result would be 999,999. Upon the tally wheel the highest number would be 99 before registering 00.

What is claimed is:

1. In a registering mechanism, two parallel shafts, a train of sum totaling wheels mounted upon one of said shafts, a set of individually operated registering wheels also mounted upon said shaft, means for producing coincident operations of the totaling wheels with the registering wheels, an actuating means for said set mounted upon the other shaft, a key actuated means for operating said actuating means, means for limiting the distance of movement of the key to actuate the primary wheel of said set a selective distance, and stopping means for the primary actuating wheels of said set actuated at the final movement of the key.

2. In a registering mechanism, two parallel shafts, a train of sum totaling wheels mounted upon one of said shafts, one of said wheels being a unit wheel, coacting means carried by the unit wheel and the adjacent wheels of the train for transmitting motion a space at a time to the adjacent wheels at each complete revolution of the unit wheel and subsequent wheels, a train of registering wheels also mounted upon said shaft with the totaling wheels, one wheel thereof being the unit wheel, coacting means carried by the unit wheel and the adjacent wheel, and the adjacent wheels throughout the train for operating the successive adjacent wheels one step at a time at every revolution of the unit or adjacent wheel, means for causing coincident operation of the totaling wheels with the registering wheels, an actuating means for operating the unit wheel of the registering wheels, key actuated means for operating said actuating means, means for limiting the distance of movement of the key to actuate the unit wheel of said sets a predetermined distance, and stopping means for the primary actuating wheel of said sets actuated at the final stop of the key.

3. In a registering mechanism, two parallel shafts, a train of successively operated totaling wheels mounted upon one of said shafts, a plurality of separate sets of individually operated registering wheels, said registering wheels being mounted upon the shaft with the totaling wheels, and each set being adapted to be operated in succession, an actuating means for each set of registering wheels mounted upon the other shaft, key actuated means for operating said actuating means, means for limiting the distance of movement of the key to actuate the unit wheel of each set a predetermined distance, and stopping means for the unit actuating wheel of each set actuated at the final stop of the key.

4. In a registering mechanism, two parallel shafts, a train of sum totaling wheels mounted upon one of said shafts, a set of individually operated registering wheels also mounted upon said shaft, means for producing coincident operations of the totaling wheels with the registering wheels, an actuating means for said set mounted upon the other shaft, a key actuated means for operating said actuating means, means for limiting the distance of movement of the key to actuate the primary wheel of said set a selective distance, and a stopping lever for the primary wheel of the registering wheels actuated at the final stop of the key.

5. In a lumber measuring and registering machine, a casing having a slot vertically disposed in the front wall thereof, a key lever mounted within the casing and operable through said slot, two shafts journaled in the casing longitudinally thereof, a set of totaling wheels mounted upon the rear shaft, a set of registering wheels mounted also upon said rear shaft, means for operating the totaling wheels coincidently with the registering wheels, a key lever controlled actuating means for the unit wheel of the registering wheels mounted upon the forward shaft, and a strip mounted for movement to regulate the length of the slot in the casing and limit the movement of the key lever.

6. In a lumber measuring and registering machine, a casing having a slot vertically disposed in the front wall thereof, a key lever mounted within the casing and operable through said slot, two shafts journaled in the casing longitudinally thereof, a set of totaling wheels mounted upon the rear shaft, a set of registering wheels mounted also upon the said rear shaft, means for operating the totaling wheels coincidently with the registering wheels, an actuating means for the unit wheel of the registering wheels mounted upon the forward shaft, coöperative means for operably connecting the key lever with its actuating means upon the depression thereof and to permit the key lever to return freely, a strip mounted for movement to regulate the length of the slot in the casing and limit the movement of the key lever, and a stopping device for the unit wheel of the registering wheels actuated by the key lever simultaneously with the stoppage of the key lever when the key lever is at the lower end of its slot.

7. In a lumber measuring and registering machine, a supporting frame, two longitudinally journaled and parallel shafts carried thereby, a set of totalizing wheels journaled upon one shaft, a plurality of sets of registering wheels journaled to one side thereof upon the same shaft, an oscillatory actuating means for the unit wheel of each set of registering wheels mounted upon the other shaft, means for causing coincident movement between the unit wheels of the registering wheels and the totalizing wheels, a key lever for operating each oscillatory means, a casing fitting over the frame and wheels and provided with a plurality of parallel slots through which said key levers project, and a single adjustable means for varying the lengths of all of the slots to limit the oscillatory movement of the key levers and consequent rotation of the registering and totalizing wheels, and a stopping device for the unit wheels of the registering wheels operably connected to its respective key lever to be released at the initial movement of the key lever, said stopping device being thrown into stopping position upon the release of its key lever.

8. In a lumber measuring and registering machine, a supporting frame, two longitudinally journaled and parallel shafts carried thereby, a set of totalizing wheels journaled upon one shaft, a plurality of sets of registering wheels journaled to one side thereof upon the same shaft, an oscillatory actuating means for the unit wheel of each set of registering wheels mounted upon the other shaft, means for causing coincident movement between the unit wheels of the registering wheels and the totalizing wheels, a key lever for operating each oscillatory means, a casing fitting over the frame and wheels and provided with observation apertures to visually exhibit certain portions of all of the registering and totalizing wheels therethrough, said casing being provided with a plurality of parallel slots through which said key levers project, a single adjustable means for varying the length of all of the slots to limit the oscillatory movement of the key levers and consequent rotation of the registering and totalizing wheels, a stopping device for the unit wheels of the registering wheels operably connected to its respective key levers, and a clutch device operably connected to the shaft carrying the totalizing and registering wheels, whereby said wheels are returned simultaneously to initial position.

9. In a registering mechanism, two parallel shafts, a train of sum totaling wheels mounted upon one of said shafts, a set of individually operated registering wheels also mounted upon said shaft, means for producing coincident operations of the totaling wheels with the registering wheels, an actuating wheel for said set rotatably mounted upon the other shaft, a key actuated means for operating said wheel, means for limiting the distance of movement of the key to actuate the primary wheel of said set a selective distance, stopping means for the primary actuating wheel of said set released at the final depression of the key and locked upon the return stroke thereof, a tally wheel disposed upon the shaft carrying the actuating wheel and in operable relation thereto to be actuated one notch at a time each movement or depression of the actuating wheel, a shield disposed between the tally wheel and the actuating wheel and provided with a slot therein near the lower end, and a spring actuated pawl carried by the actuating wheel to ride upon said shield and enter said aperture to operate the tally wheel at the final operation of the actuating wheel.

10. In a lumber measuring and registering machine, a key actuated mechanism, a casing inclosing said mechanism and provided with a slot through which the key projects and is limited in its movement thereby, and adjustable means for varying the length of the slot and the consequent movement of the key.

11. In a lumber measuring and registering machine, a key actuated mechanism, a casing inclosing said mechanism and provided with a slot through which the key projects, said key being limited in its reciprocation by means of the slot, and an adjustable strip disposed in co-active relation with the casing to vary the length of the slot and consequently the movement of the key.

12. In a registering mechanism, two parallel shafts, a train of sum totaling wheels mounted upon one of said shafts, a set of individually operated registering wheels also mounted upon said shaft, means for producing coincident operation of the totaling wheels with the registering wheels, an arm freely rotatable upon the same shaft and adjacent the unit wheel of the set of registering wheels, co-acting means carried by the arm and unit wheel to cause the arm to move the unit wheel in one direction, spring returned manually actuated means for actuating the arm to operate the unit wheel, and means actuated at the final movement of the arm to halt the unit wheel.

13. In a registering mechanism, two parallel shafts, a train of sum totaling wheels mounted upon one of said shafts, a set of individually operated registering wheels also mounted upon said shafts, means for producing coincident operation of the totaling wheels with the registering wheels, an arm freely rotatable upon the same shaft and adjacent the unit wheel of the set of registering wheels, co-acting means carried by the arm and unit wheel to cause the arm to move the unit wheel in one direction, spring returned and manually actuated means for actuating the arm to operate the unit wheel, and adjustable means for limiting the distance of the return movement of the arm and spring returned and manually actuated means.

14. In a registering mechanism, two parallel shafts, a train of sum totaling wheels mounted upon one of said shafts, a set of individually operated registering wheels also mounted upon said shaft, means for producing coincident operation of the totaling wheels with the registering wheels, an arm freely rotatable upon the same shaft and adjacent the unit wheel of the set of registering wheels, co-acting means carried by the arm and unit wheel to cause the arm to move the unit wheel in one direction, spring returned and manually actuated means for actuating the arm to operate the unit wheel, means actuated at the final movement of the arm to halt the unit wheel, and a tally wheel operable by the spring returned and manually actuated means.

15. In a registering mechanism two parallel shafts, a train of sum totaling wheels mounted upon one of said shafts, a set of individually operated registering wheels also mounted upon said shaft, means for producing coincident operation of the totaling wheels with the registering wheels, an arm freely rotatable upon the same shaft and adjacent the unit wheel of the set of registering wheels, co-acting means carried by the arm and unit wheel to cause the arm to move the unit wheel in one direction, spring returned and manually actuated means for actuating the arm to operate the unit wheel, means actuated at the final movement of the arm to halt the unit wheel, adjustable means for limiting the distance of the return movement of the arm and spring returned and manually actuated means, and a tally wheel operable by the spring returned and manually actuated means.

16. In a registering mechanism, two parallel shafts, a train of sum totaling wheels mounted upon one of said shafts, a set of individually operated registering wheels also mounted upon said shaft, means for producing coincident operation of the totaling wheels with the registering wheels, an arm freely rotatable upon the same shaft and adjacent the unit wheel of the set of registering wheels, co-acting means carried by the arm and unit wheel to cause the arm to move the unit wheel in one direction, spring returned and manually actuated means for actuating the arm to operate the unit wheel, means actuated at the final movement of the arm to halt the unit wheel, means for locking the totaling and registering wheels against retrograde movement, means for releasing said last means, and means mounted upon the shaft for returning the wheels to initial position.

17. In a registering mechanism, a set of registering wheels, an arm mounted adjacent the unit wheel and for individual movement, manually actuated and spring returned means for oscillating said arm, co-acting means carried by the arm and the unit wheel for operably connecting the unit wheel to the arm when the arm is manually operated, and means for limiting the unit wheel operating movement of the arm and stopping the unit wheel.

18. In a registering mechanism, a set of registering wheels, an arm mounted adjacent the unit wheel and for individual movement, manually actuated and spring returned means for oscillating said arm, co-acting means carried by the arm and the unit wheel for operably connecting the unit wheel to the arm when the arm is manually operated, means for limiting the unit wheel operating movement of the arm and stopping the unit wheel, and a tally wheel operably connected to the manually actuated and spring returned and means actuated by each manual actuation of said means.

19. In a registering mechanism, a set of registering wheels, an oscillatory arm adjacent to the unit wheel thereof, a toothed band carried concentrically of and by the unit wheel, a spring pawl carried by the arm to engage the teeth to move the unit wheel when the arm is moved in one direction, manually actuated and spring returned means for oscillating the arm, and means disposed in the path of to be engaged by the arm at the end of its manual stroke to stop the unit wheel.

20. In a registering mechanism, a set of registering wheels, an oscillatory arm adjacent to the unit wheel thereof, a toothed band carried concentrically of and by the unit wheel, a spring pawl carried by the arm to engage the teeth to move the unit wheel when the arm is moved in one direction, manually actuated and spring returned means for oscillating the arm, means disposed in the path of to be engaged by the arm at the end of its manual stroke to stop the unit wheel, and means disposed in the path of to be engaged by the arm to limit its stroke in the opposite direction.

21. In a registering mechanism, a set of registering wheels, an oscillatory arm adjacent to the unit wheel thereof, a toothed band carried concentrically of and by the unit wheel, a spring pawl carried by the arm to engage the teeth to move the unit wheel when the arm is moved in one direction, manually actuated and spring returned means for oscillating the arm, means disposed in the path of to be engaged by the arm at the end of its manual stroke to stop the unit wheel, and adjustable means for limiting the return movement of the arm and to regulate the distance of the movement to be imparted to the unit wheel.

22. In a registering mechanism, a set of registering wheels, an oscillatory arm adjacent to the unit wheel thereof, an oscillatory toothed segment operably connected to the arm, a key for moving the segment in one direction, a spring for moving the segment in the opposite direction, co-acting means carried by the arm and unit wheel for causing the unit wheel to be moved in one direction when the segment is actuated due to the manipulation of the key, and means for stopping the unit wheel at the end of the manual movement of the arm.

23. In a registering mechanism, a set of registering wheels, an oscillatory arm adjacent to the unit wheel thereof, an oscillatory toothed segment operably connected to the arm, a key for moving the segment in one direction, a spring for moving the segment in the opposite direction, co-acting means carried by the arm and unit wheel for causing the unit wheel to be moved in one direction when the segment is actuated due to the manipulation of the key, means for stopping the unit wheel at the end of the manual movement of the arm, and means for limiting the return movement of the arm and segment.

24. In a registering mechanism, a set of registering wheels, an oscillatory arm adjacent to the unit wheel thereof, an oscillatory toothed segment operably connected to the arm, a key for moving the segment in one direction, a spring for moving the segment in the opposite direction, co-acting means carried by the arm and unit wheel for causing the unit wheel to be moved in one direction when the segment is actuated due to the manipulation of the key, means for stopping the unit wheel at the end of the manual movement of the arm, and adjustable means for varying the return movement of the arm and segment and consequently the registering movement of the unit wheel.

In testimony that we claim the foregoing as our own, we have hereto affixed our signatures in the presence of two witnesses.

JOSEPH W. HALEY.
CHARLES B. YELTON.

Witnesses:
C. W. McCollum,
J. W. Taliaferro.